Figure 1:
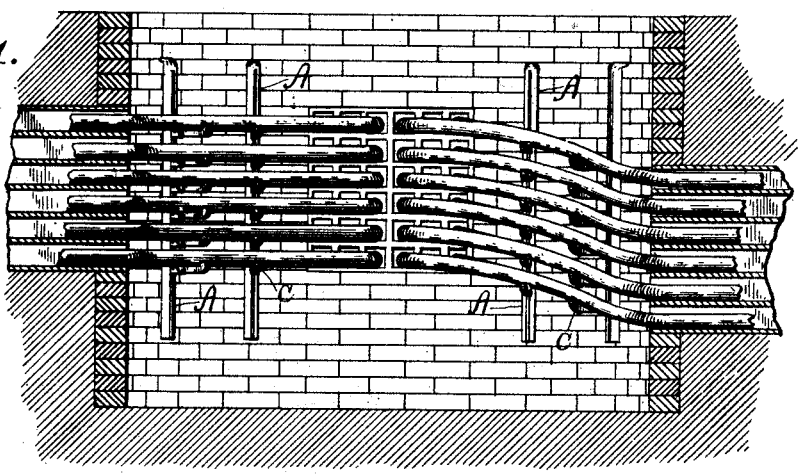

No. 622,778. Patented Apr. 11, 1899.
W. A. NORDYKE.
CABLE SUPPORT.
(Application filed Aug. 3, 1898.)
(No Model.)

WITNESSES:
C. S. Frye.
J. A. Walsh.

INVENTOR
Walter A. Nordyke,
BY
Chester Bradford,
ATTORNEY.

THE NORRIS PETERS CO., PHOTO-LITHO., WASHINGTON, D. C.

UNITED STATES PATENT OFFICE.

WALTER A. NORDYKE, OF INDIANAPOLIS, INDIANA.

CABLE-SUPPORT.

SPECIFICATION forming part of Letters Patent No. 622,778, dated April 11, 1899.

Application filed August 3, 1898. Serial No. 687,633. (No model.)

*To all whom it may concern:*

Be it known that I, WALTER A. NORDYKE, a citizen of the United States, residing at Indianapolis, in the county of Marion and State of Indiana, have invented certain new and useful Improvements in Cable-Supports, of which the following is a specification.

In the preparation of conduits for underground cables such as are used in telephone and telegraph work it is, as is well known, necessary to provide openings at certain intervals by means of which access may be had thereto in order that the work of laying and repairing such cables may be properly done. Such openings are commonly in the form of pits which intersect the conduits and are provided with covers at the street-surface and are usually known as "manholes." The distance across such pits should be sufficient to permit the operative to work therein freely, and while they are of various sizes, depending somewhat upon the capacity required, they are frequently as much as eight feet in diameter. The cables being composed of fine wires insulated from each other by flexible material and usually protected by a lead covering are not stiff enough to support their own weight in passing across (or around the sides of) these pits. It is therefore necessary, or at least highly desirable, to provide supports at suitable intervals upon which the cables may be carried and the strain thereon relieved and sagging prevented. Obviously such supports should be adjustable to meet the requirements of the work as it progresses and so that each support may be arranged at exactly the proper height to carry the cable or tier of cables which may be laid at that level. To originally provide all the arms or supports which are liable to be used and fix them rigidly in the wall when the pit is being built would obviously add considerably to the expense to be incurred at the time and would interfere seriously with the available working-space, while such arms admit of no subsequent adjustment or manipulation.

The object of my invention is to obviate the disadvantages above enumerated and to provide a means by which any desired number of arms or supports for cables can be provided and adjusted as required and in a manner so that no more arms than are actually required at the time need to be used; and it consists in suitable uprights having arms or hooks which may be adjustably secured thereon and in various details of construction relating to said uprights and to said arms, all as will be hereinafter more particularly described and claimed.

Figures 2, 3:
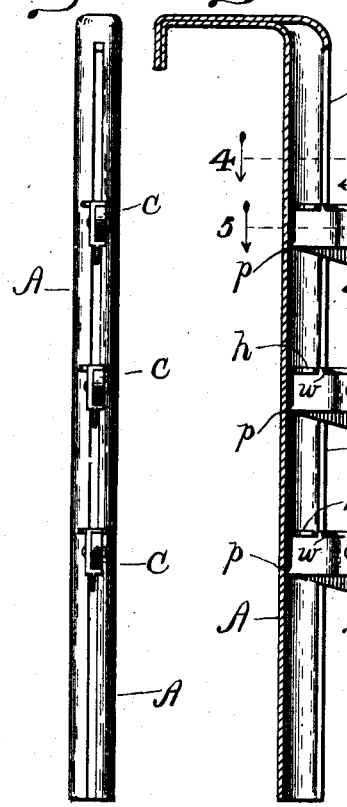
Figure 4:
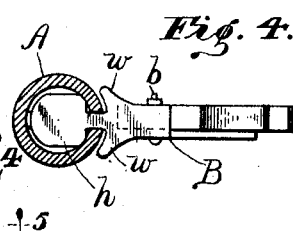
Figure 5:
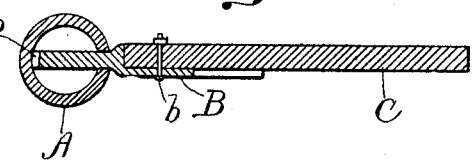
Figure 6:
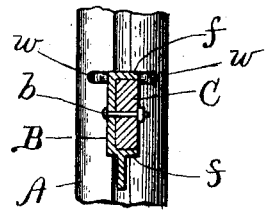
Figure 7:
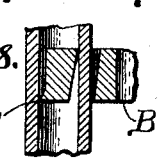
Figure 8:
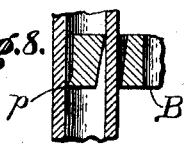

Referring to the accompanying drawings, which are made a part hereof and on which similar letters of reference indicate similar parts, Figure 1 is a sectional view of a pit or manhole provided with cable-supports embodying my present invention; Fig. 2, a detail front elevation, on an enlarged scale, showing one such support in a preferred form; Fig. 3, a central sectional view of the upright, showing the arms in side elevation; Fig. 4, a horizontal sectional view looking downwardly from the dotted line 4 4 in Fig. 3; Fig. 5, a horizontal sectional view on the dotted line 5 5; Fig. 6, a transverse sectional view of one of the arms on the dotted line 6 6, showing the means of uniting the metal and wooden portions of the same; Fig. 7, a view similar to a portion of Fig. 4, showing an alternative construction; and Fig. 8, a detail sectional view on the dotted line 8 8 in Fig. 7.

The upright A is preferably formed from a metal tube similar to ordinary gas-pipe, except that there is a slit in one side to receive the shanks of the arms or hooks by which the cable is directly supported. At its upper end it is bent over and extended a suitable distance horizontally, while its extreme end is bent again so as to be substantially parallel with the main portion, and this upper end in use is built into the wall of the pit as said wall is being erected. While I regard the pipe form of upright as possessing certain advantages over other forms, I do not desire to be confined to said form, as it is obvious that the form may be varied in many ways without departing from the essential features of my invention, and I have shown in Figs. 7 and 8 how an I-beam form of upright may be used instead of the pipe.

The cable-supporting arms or hooks consist, preferably, of two parts, one of which, B, has a shank which extends through the slit in the pipe to the interior and is adapted to be easily moved up and down said upright. At its lower rear extremity it is provided with a comparatively sharp point $p$, which when the hook is loaded grips onto the interior surface of the upright, while the front side of the head $h$ bears upon the inside of the front of the said upright. Wings $w$ (see Fig. 4) are shown as extending out from the parts B alongside the surface of the tubular upright A. In cases where several hooks are used and there might otherwise be danger of said pipe spreading under the strain these wings will prevent such spreading. It is desirable that the other portions C of these cable-supports should be of wood or some such material less liable than metal to corrode and injure the cables and which is also in itself of an insulating character. These parts may be of any desired length and each thus adapted to serve as rests for several cables. I have shown them as adapted to receive and support three cables each. The parts B are provided with flanges $f$, (see especially Fig. 6,) between which the inner ends of the parts C are placed, and bolts $b$ are provided as a convenient means of attachment of the two parts.

The adjustable feature of my support is of great value, as it not only enables me to support cables at exactly the points desired, which, especially where the conduits are at different levels, as is shown at the right in Fig. 1, has frequently been a matter of some difficulty, but also permits the cables to be placed more closely together than is possible with non-adjustable supports.

In use the upper cable or tier of cables should first be properly positioned and supported at the desired height by means of the upper supporting arms or hooks. The cable or tier of cables immediately below the first and which rest in the notches of the second set of arms or hooks are then adjusted to the proper position, which, as generally arranged, brings the tops of the cables in contact with or close to the under sides of the upper set of arms or hooks, as best shown in Fig. 1. When adjusted, as will be observed, the arms or hooks are much nearer together than the diameter of the cables, the latter being partially received within the notches of the former. This manipulation is continued until all the cables are in the desired situations, which results in considerable economy of space. When it is desired to remove a cable, the adjacent arms are loosened and moved until sufficient space is obtained through which to take out the cable in question.

In the views showing an alternative form of upright the use, operation, and method of manipulation are the same; but the gripping ends of the cable-supporting arms are exposed instead of being inclosed within a tubular structure, as in my preferred construction.

Having thus fully described my said invention, what I claim as new, and desire to secure by Letters Patent, is—

1. The combination, with underground conduits for cables, and the pits or manholes intersecting such conduits, of uprights situated within said pits or manholes alongside the walls thereof, and suitable detachable and adjustable arms or hooks carried by said uprights, whereby the cables as they pass around the pits from the points where they emerge from one conduit to the points where they re-enter another may be supported as desired, substantially as set forth.

2. A cable-support for underground cables, consisting of a tubular upright having a slit in one side, and cable-supporting arms or hooks adapted to enter said slit and be adjustably supported on said upright.

3. In a support for underground cables, a tubular upright A having a slit in one side, and cable-supporting hooks or arms the shanks whereof are adapted to enter said slit and which are provided with impinging points whereby they are enabled to grip said upright at any desired point, substantially as set forth.

4. The combination, in a support for underground cables, of a suitable upright, cable-supporting hooks or arms adapted to be carried by said upright and provided with suitable gripping-points $p$ by which they will be held at any desired point thereon.

5. The combination, in a cable-support, of a slitted tubular upright, and arms carried by said upright, said arms having shanks which pass through the slit and heads on the inner ends thereof and wings $w$ which extend out therefrom and partially encircle the tube, substantially as and for the purposes set forth.

In witness whereof I have hereunto set my hand and seal, at Indianapolis, Indiana, this 1st day of August, A. D. 1898.

WALTER A. NORDYKE. [L. S.]

Witnesses:
CHESTER BRADFORD,
JAMES A. WALSH.